H. J. BRESSON.
WATER CLOSET BOWL.
APPLICATION FILED OCT. 17, 1918.

1,313,060.

Patented Aug. 12, 1919.

Witness
Karl H. Butler
Chas. W. Stauffer

Inventor
Henry J. Bresson,
By
Attorneys

UNITED STATES PATENT OFFICE.

HENRY J. BRESSON, OF DETROIT, MICHIGAN.

WATER-CLOSET BOWL.

1,313,060.  Specification of Letters Patent.  Patented Aug. 12, 1919.

Application filed October 17, 1918. Serial No. 258,560.

*To all whom it may concern:*

Be it known that I, HENRY J. BRESSON, a citizen of the United States of America, residing at Detroit, in the county of Wayne and State of Michigan, have invented certain new and useful Improvements in Water-Closet Bowls, of which the following is a specification, reference being had therein to the accompanying drawings.

My invention aims to provide a water closet bowl with a novel trap or basin to which easy access may be had for removing rags, stiff paper and other matters that tend to clog the outlet of the bowl, retard the flow of water therethrough and eventually cause the bowl to overflow, not only rendering the bowl useless for the time being but causing considerable damage to the floor in proximity to the bowl.

My invention further aims to provide a water closet bowl with a detachable trap member that is seated in the bowl and water sealed relative thereto, so that obnoxious gases cannot escape from the bowl or sewer communicating therewith.

My invention possesses other advantages that will appear as the construction of the water closet bowl is better understood, and reference will now be had to the drawing, wherein—

Figure 1:
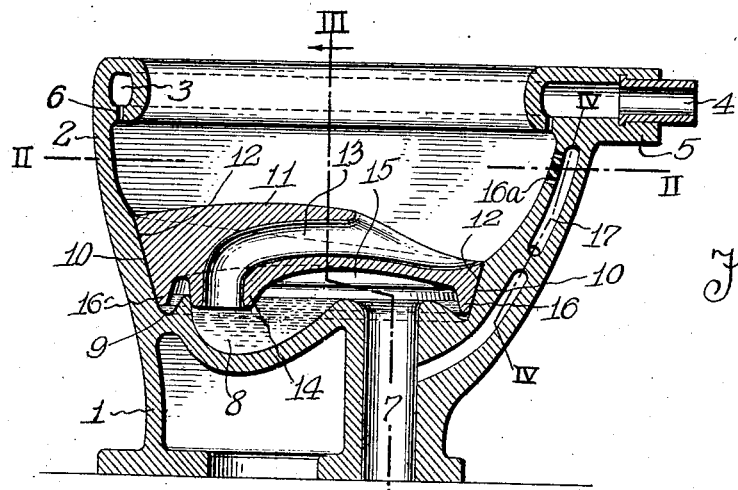
Figure 1 is a vertical longitudinal sectional view of the water closet bowl.
Figure 2:
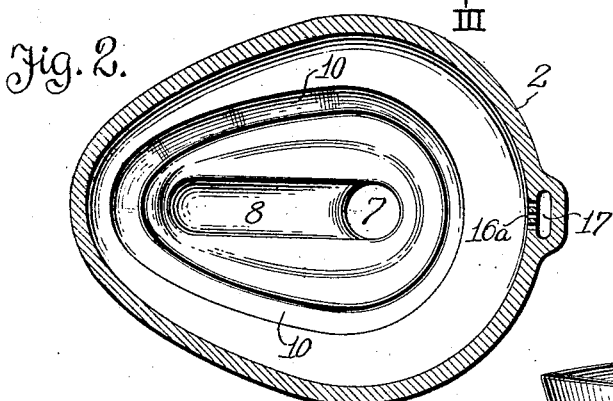
Fig. 2 is a horizontal sectional view taken on the line II—II of Fig. 1.

In the drawing, the reference numeral 1 denotes a base or pedestal portion of a bowl or hopper body 2, which has an exterior shape or configuration somewhat similar to an ordinary water closet bowl. The upper edges or rim of the bowl body 2 provide a channel 3 which has the rear portion thereof in communication with a water supply pipe 4, said pipe having its ends suitably mounted in a boss 5 at the rear side of the bowl 2. The channel 3 communicates with a plurality of small openings 6 in proximity to the walls of the bowl 2, and water ejected through the openings 6 is adapted to wash the inner wall of the bowl 2 and flush said bowl, said water eventually leaving the bowl through a sewer connection or opening 7 in the base or pedestal portion of the bowl.

The bowl or hopper body 2 has the bottom thereof shaped to provide a basin 8 and said basin is located between the front and side walls of the bowl body 2 and has its rear edge communicating with the sewer connection 7. Between the basin 8 and the walls of the bowl or hopper body 2 is a groove 9 having its outer wall forming part of a tapering seat 10 in the bowl body 2, and said groove, as well as the basin 8, are adapted to receive water and form a seal between the sewer connection 7 and the upper part of the bowl body 2, so that obnoxious gases cannot escape from the sewer connection 7 into the closet or compartment in which the bowl 2 is placed.

Figure 5:
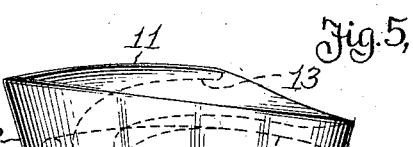
Fig. 5 is a side elevation of the detached trap member.
Figure 3:
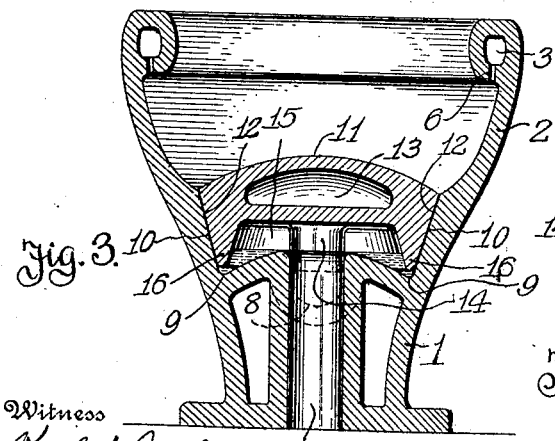
Fig. 3 is a vertical cross sectional view of the bowl taken on the line III—III of Fig. 1.
Figure 6:
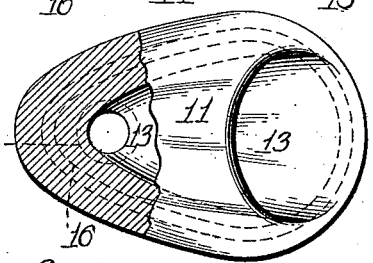
Fig. 6 is a plan of the same, partly broken away and partly in section.

Detachably mounted on the tapering seat 7 of the bowl body 2 is a trap member 11, said member being substantially oval in plan with tapering side walls 12 to engage the seat 10 of the bowl body. The top of the trap member 11 is substantially convex so that matter deposited on said trap member will be washed to the side edges thereof, and by reference to Figs. 1 and 5, it will be noted that the side edges of the trap member are inclined rearwardly, thus causing water and matter to be carried toward a large opening 13 in the rear portion of the trap member 11. The opening 13 extends forwardly and downwardly to communicate with a sleeve portion 14 of the trap member, said sleeve portion being in proximity to the front end of the trap member and adapted to extend into the basin 8 at its front wall.

The lower face of the trap member 11 is concaved or recessed, as at 15 for two purposes, first the recessing of the lower face of the trap member 11 provides a depending flange 16 at the side walls of said member and it is this depending flange that extends into the groove 9 and water therein to liquid seal the side edges of the trap member. Second, the recessed lower face of the trap member affords a passage or chamber establishing communication between the basin 8 and the sewer connection 7, so that water in the basin 8 may overflow into the sewer connection when the bowl is flushed and thus carry with it any excrement, waste or solid matter placed in the bowl and capable of being carried off by a sewer without any danger of the same being clogged. Should a rag, heavy paper, or other solid matter be placed in the bowl and lodged in the opening 13, sleeve portion 14, basin 8 or sewer connection 7 the trap member 11 is removed, and this can be easily accomplished by gripping said trap member at the upper front edge of the opening 13 which affords a ledge or hand grip, as clearly shown in Fig. 1. With the trap member removed, easy access is had to the groove 9, the basin 8, and the sewer connection 7, so that rags or other solid matter can be removed from the bowl and all parts thereof, as well as the trap member 11 thoroughly cleaned and placed in a sanitary condition.

Figure 4:
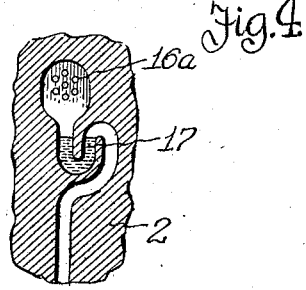
Fig. 4 is a detail sectional view of a portion of the bowl taken on the line IV—IV of Fig. 1.

For fear that the bowl should be clogged in the basin 8 or the opening 13, unaware to the user of the bowl, and the same be flushed, provision has been made for carrying off the water to the sewer connection 7, independent of the basin 8 and the trap member 11. This is accomplished by providing the rear wall of the bowl body 2 below the apertured rim thereof, with a series of overflow openings 16ª communicating with a trap or seal passage 17 that extends downwardly in the rear wall of the bowl and communicates with the sewer connection 7. The trap and seal passage 17 is best shown in Figs. 1 and 4, and this passage will maintain a small quantity of water in the rear wall of the bowl body so as to prevent the escape of effluvium from the sewer connection 7.

It is thought that the utility of my improved water closet bowl will be apparent without further description, and while in the drawing there is illustrated a preferred embodiment of the same, it is to be understood that the structural elements and design of the bowl may be varied or changed without departing from the spirit of the appended claims.

What I claim is:—

1. A water closet bowl comprising a body having the bottom thereof provided with a basin and a sewer connection into which said basin is adapted to overflow said bowl body having a groove around said basin and its sewer connection, and a trap member seated in said bowl body and extending into the groove thereof, said trap member having an opening communicating with the basin of said bowl body.

2. A water closet bowl comprising a body having a basin and a sewer connection in the lower portion thereof, said bowl body having a groove around said basin and the sewer connection thereof, a trap member detachably seated in said bowl body and having the lower face thereof recessed to establish communication between the basin and sewer connection of said bowl body and provide a flange adapted to extend into the groove thereof, said trap member having an opening therein communicating with the basin of said bowl body, and means providing an overflow connection between said bowl body and the sewer connection thereof independent of said trap member.

3. A water closet bowl comprising a body having a basin and sewer connection in the lower portion thereof, said body having a groove around said basin and the sewer connection thereof a detachable trap member seated in said bowl body and provided with a convexed upper face, tapering toward the rear edge of said trap member and communicating with an opening therein which extends toward the front edge of said trap member and terminates in a sleeve portion extending into the basin of said bowl body, said trap member having the lower face thereof recessed to establish communication between the basin and sewer connection of said bowl body and provide a depending flange extending into the groove of said bowl body, and means in the rear wall of said bowl body establishing an overflow connection between said bowl body and the sewer connection thereof independent of said trap member.

In testimony whereof I affix my signature in the presence of two witnesses.

HENRY J. BRESSON.

Witnesses:
ANNA M. DORR,
KARL H. BUTLER.

Copies of this patent may be obtained for five cents each, by addressing the "Commissioner of Patents, Washington, D. C."